United States Patent [19]

Vance, Jr.

[11] 4,029,538

[45] June 14, 1977

[54] ULTRASONIC FILM SPLICER

[75] Inventor: Wallace I. Vance, Jr., Torrance, Calif.

[73] Assignee: Metro/Kalvar Corporation, Darien, Conn.

[22] Filed: July 13, 1976

[21] Appl. No.: 704,806

Related U.S. Application Data

[63] Continuation of Ser. No. 363,091, May 23, 1973, abandoned.

[52] U.S. Cl. .............................. 156/502; 156/580.1
[51] Int. Cl.² .................. B65H 21/00; G03D 15/04
[58] Field of Search ................ 156/73.1, 73.4, 380, 156/502, 505, 580.1, 157, 159

[56] References Cited

UNITED STATES PATENTS

| | | | |
|---|---|---|---|
| 3,556,912 | 1/1971 | Burgo et al. | 156/580.1 |
| 3,737,361 | 6/1973 | Obeda | 156/580.1 |
| 3,764,442 | 10/1973 | Parry | 156/580.2 |

Primary Examiner—Douglas J. Drummond
Assistant Examiner—Thomas Bokan
Attorney, Agent, or Firm—Cushman, Darby & Cushman

[57] ABSTRACT

The present invention is directed to an ultrasonic film splicer for ultrasonically bonding all conventional plastic film bases.

The present splicer basically comprises film holding means for retaining the edges of two film strips to be spliced; film cutting means whereby the edges of the two film strips are severed in a mating relationship; film transport means for moving the film within an ultrasonic compression zone whereby the severed ends of the film are positioned in a fixed overlapped relationship ready for bonding; and ultrasonic bonding means comprising rotatably mounted anvil means and stationary narrow elongated transducer means which define the ultrasonic compression zone wherein the film strips to be spliced are positioned and oscillatory energy applied thereto by line contact by virtue of said bonding means.

8 Claims, 5 Drawing Figures

ULTRASONIC FILM SPLICER

This is a continuation of application Ser. No. 363,091 filed May 23, 1973, and now abandoned.

BACKGROUND OF THE INVENTION

The present invention relates to the art of bonding of plastic films. More specifically, the present invention provides a method and apparatus for ultrasonically bonding thermoplastic photographic film by the application of oscillatory energy applied along a thin line of contact and essentially perpendicular to the overlapped edges of such film. The instant invention encompasses the ultrasonic bonding of all conventional bases for photographic films.

The adaptation of ultrasonic means for the bonding of plastic materials is old and well known in the art. Ultrasonic bonding offers many distinct advantages and improvements, especially for splicing photographic films employing certain types of base materials, such as polyesters which are finding increased professional use, over older known splicing techniques such as by taping and the like. The technique involves placing work members to be joined in an overlapping position and thereafter applying appropriate ultrasonic bonding pressure. It has been noted that the ultrasonic energy applied to the overlapping work pieces is accompanied by a degree of heating which is primarily due to the frictional forces existing between the overlapping surfaces of the work pieces whereby molecular and/or fusion bonding occurs. Needless to say, this technique has been applied to the bonding of photographic film, e.g. celluose triacetate. The December 1961 issue, volume 70, of the "Journal of the Society of Motion Picture and Television Engineers" contains an article at page 976 which discloses an ultrasonic technique for splicing motion picture film. Numerous devices have also been perfected to practice this technique.

A number of photographic film splicers available on the market today utilize a sealing assembly comprising anvil and horn means which define a compression zone in which work pieces are operably positioned for bonding. The horn is generally connected to ultrasonic means whereby oscillatory energy is imparted to the overlapping work pieces confined between the horn and the anvil. In these prior art devices, the oscillatory energy applied to the work pieces confined between the anvil and the horn is applied over the entire width of the compression zone defined between the anvil and the horn. It can be appreciated that where the compression zone is established other than by a small area of contact between such members, then the size of the transducer or driver of the ultrasonic means must be sufficient when energized to thereby vibrate the horn at the requisite ultrasonic bonding frequency as compared to that required in a splicing operation where only a small area of contact between the anvil and the horn is employed. The net result is that a considerable greater power input to the equipment is required.

Another inherent problem in prior art splicers employing an anvil and horn assembly whereby the bonding pressure is applied over a relatively wide area, that is, other than by a small area of contact, is the fact that the anvil and horn members must be carefully aligned whereby essentially uniform pressure is applied over the entire area. Otherwise, it has been observed that an uneven application of the oscillatory energy tends to cause burning of the film strips in the area of the highest clamping pressure, and in any event, the low pressure area may not even receive sufficient energy to achieve a splice or bond in that area. Thus, to achieve a satisfactory ultrasonic film splice, the clamping pressure must be applied uniformly. Moreover, even if the clamping pressure is not excessive to the extent that burning does not occur, warping or interference with the sound track quite often imparted to the edge of the film may occur. The net result is the fact that such prior art ultrasonic splicers generally cost more to produce due to the manufacturing tolerances that must be met in their manufacture as a primary factor of the alignment that must be maintained between the horn and anvil, as well as the related components for clamping and aligning the film strips in the compression zone defined by those members. Needless to say, the maintenance of such equipment is greater since the normal wear and tear on the equipment would pose a problem in keeping the equipment properly aligned.

Splicers have been developed which employ a small area of contact between a transducer horn member and an anvil member. However, the design and mode of operations of such splicers have been found to result in excessive wear to the ultrasonic work surfaces, especially to the horn.

Many prior art splicers also require that the emulsion and/or an antistatic coating on a photographic film be first scraped off before splicing, especially in the case of polyester films, including those having conventional emulsions.

Among the distinct advantages and features of the present invention is the provision of an ultrasonic film splicer of a design simplicity such that it can be economically manufactured and is inexpensive to operate and maintain. It has been found that the present splicer requires less power input for operation for a given splicing operation; requires less time to achieve a commercially acceptable splice, avoids burning or overheating of the film whereby warping and its related problems are avoided; avoids excessive application of pressure to the film in a manner whereby such pressure can be readily controlled, allows exceptionally accurate alignment of film strips to be spliced, produces a relatively opaque smooth narrow integral splice which avoids interference with the film sound track, fogging of unexposed film adjacent the splicer area, and flow of material into the perforated film (as well as avoids weakening of the small width of film on the outside edge of the perforation; is small and compact; is easy to maintain; can be employed with divergent films of various thicknesses and width; is easy to operate, particularly in a darkroom; does not require scraping off of the film emulsion (thereby avoiding a dust problem); and greatly minimizes scratching of the film strips in their handling as well as scratching of the film in the splicing zone. The net result is a superior spliced film free of impairment to its structure, photographic characteristics, or sound track. Moreover, film wastage is essentially eliminated due to the superiority of a splice made pursuant to the present method whereby film need not be cut out due to unsuccessful film splices. These and other distinct advantages and features of the present invention will become apparent to one skilled in the art in light of the following detailed description of the preferred embodiments of the present invention.

DESCRIPTION OF THE PREFERRED EMBODIMENT

The present ultrasonic film splicer 10, referring to FIG. 1 in the drawings, basically comprises the film block assembly 11 for holding the film in position for cutting and subsequently transporting the film to an ultrasonic compression zone for splicing the film, which means is also shown in greater detail in FIG. 3 in the drawings as described hereinafter. The splicer 10 further comprises the cutter assembly 12; the ultrasonic bonding assembly means 13; face plate assembly 14; together with the various other incidental mechanical and electrical components shown in FIG. 2 in the drawings and as described in detail hereinafter.

Figure 1:
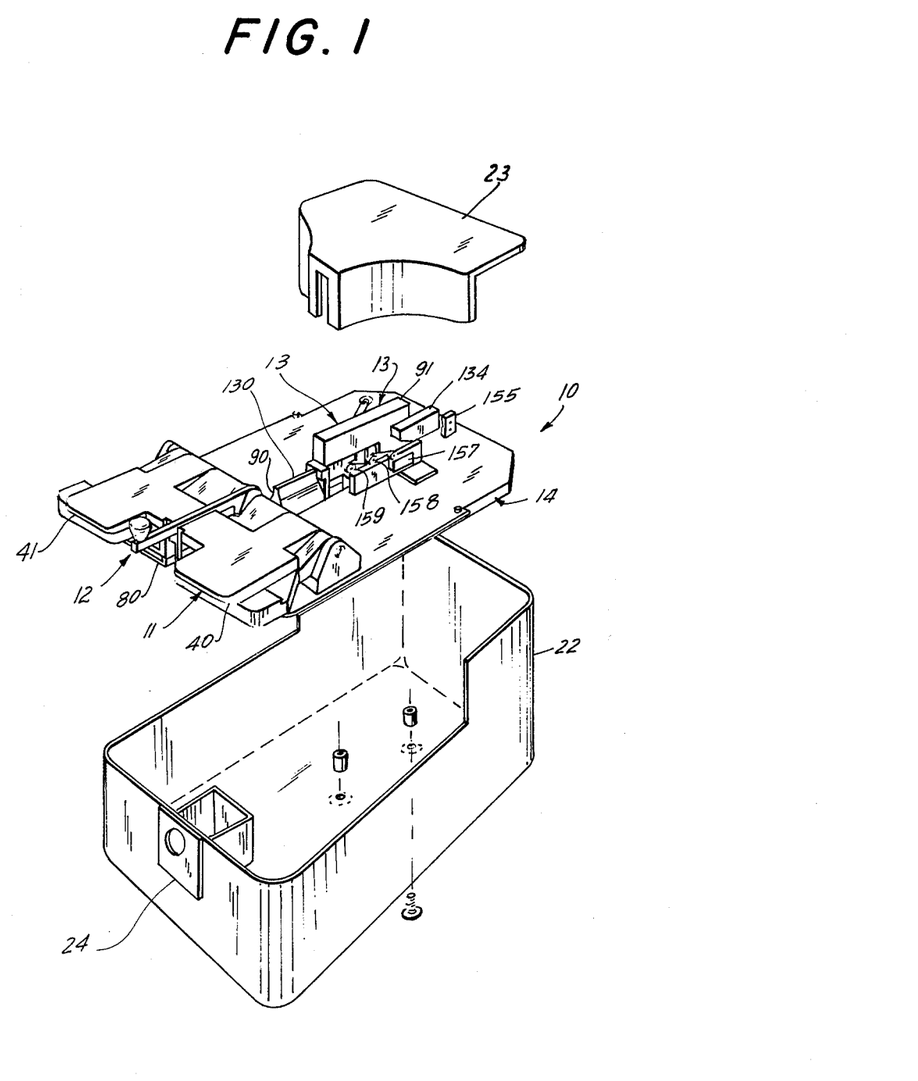
FIG. 1 in the drawings depicts an exploded isometric view of the top portion of the present ultrasonic tape splicer apparatus.
Figure 2:
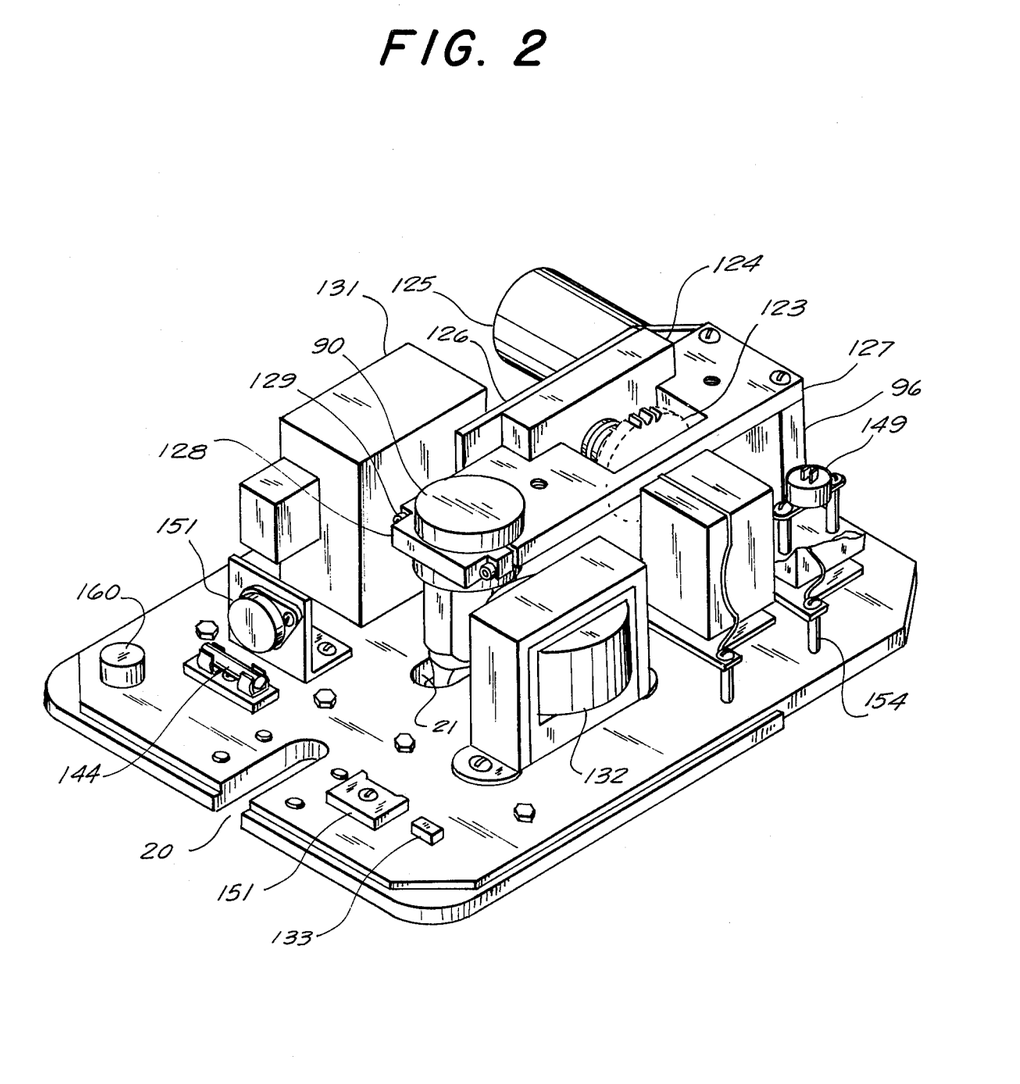
FIG. 2 in the drawings depicts an isometric view of the bottom portion of the present ultrasonic splicer showing various of its components which are attached to the underside of the top portion shown in FIG. 1.

Referring to FIGS. 1 and 2 in the drawings, the face plate assembly 14 is provided with the cutout portion 20 as shown in FIG. 2 over which the guillotine cutter assembly 12 is operably positioned. The face plate assembly 14 is further provided with the cutout portion 21 for receiving the horn member 90 of the ultrasonic bonding means 13 as described in detail below. The face plate assembly 14 is adapted to fit and nest within the face plate support member 22 which also serves to house the various mechanical and electrical components of the present splicer which are mounted underneath the face plate assembly 14, and further, serves as the basic support and shroud to prevent operator contact with those components as well as maintain them in a dust free atmosphere. The top cover 23 is provided for housing the anvil portion of the ultrasonic bonding means 13 when it is in a parked position, as well as preventing scratching of film on the exposed parts while operating the device in the dark. The trim cup 24 is provided for catching film leavings from the cutter 12.

Figure 3:
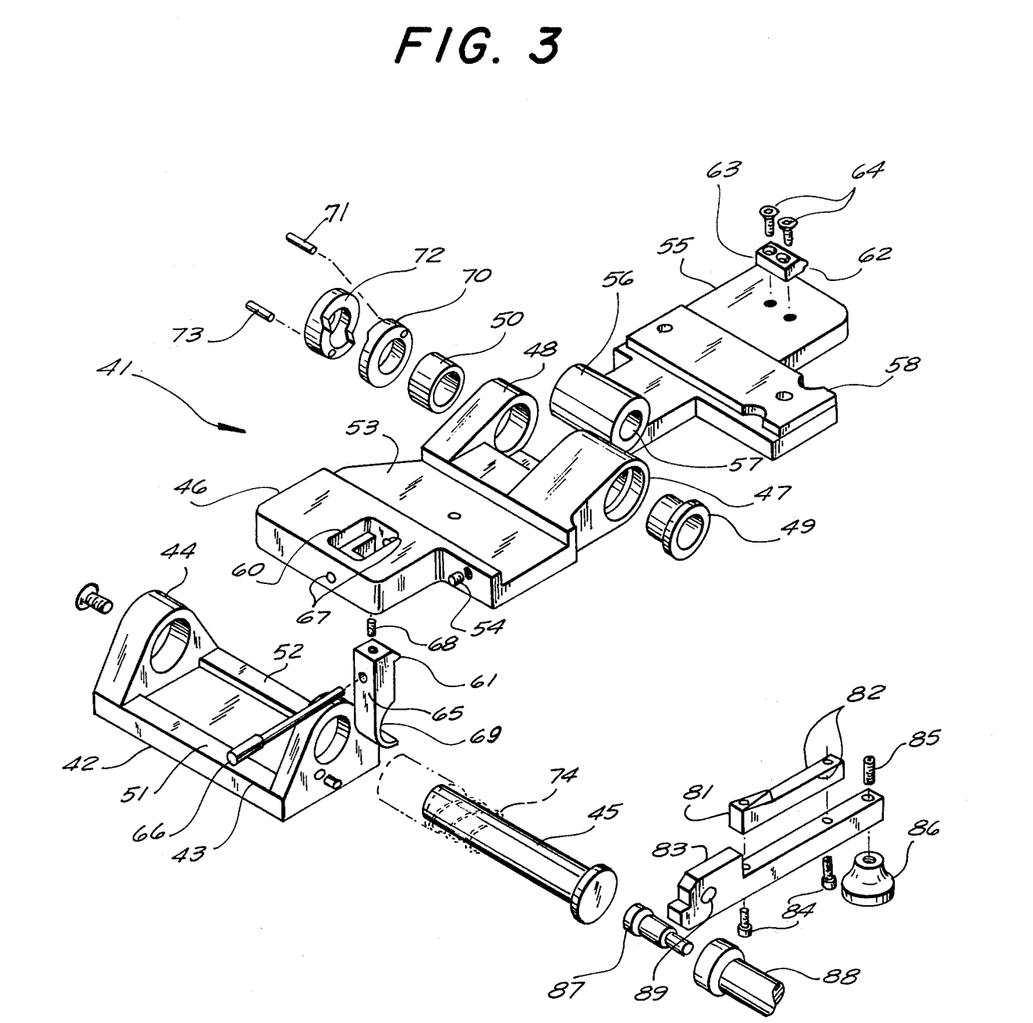
FIG. 3 in the drawings depicts an exploded isometric view of the film retaining, cutting and transporting means of the present splicer.

Referring to FIGS. 1 and 3 in the drawings, the film block assembly 11 comprises the subassemblies 40 and 41 which are identical in design except to the extent that one member is the diametric opposite in design to that of the other member, and accordingly, the subassembly 40 is referred to as the right film block subassembly and the subassembly 41 as the left film block subassembly.

Referring to FIG. 3 in the drawings which depicts the left hand film block assembly 41, that component further comprises the hinged block member 42 which is adapted for being permanently affixed to the face plate assembly 14. The member 42 is provided with the upright stanchion portions 43 and 44 which portions are bored to receive the left hinge pin 45 and between which the hinged film block member 46 is rotatably mounted upon the left hinge pin 45. The hinged film block 46 is provided with the journaled portions 47 and 48 which are bored to receive the shoulder bushing 49 and bushing 50 respectively. The latter in turn are bored to receive the hinge pin 45 which bayonnets through the bore holes of the stanchion portions 43 and 44, respectively, of the hinge block 42, and through the bushings 49 and 50 which rotatably support the hinged film block 46. By such structure, the hinge block 46 can be rotated backwards around the longitudinal axis of the hinge pin 45 for the reasons as brought out below.

The hinged film block 46 is an essentially flat member of the configuration shown in FIG. 3 which in its initial position of use is supported upon the hinge block 42 such that the bottommost surface of the extended portions 47 and 48 rest upon the horizontal portion 51 of the hinge block 42. Conversely, as the member 46 is rotated backwards through an arcuate path of 180°, the topmost surface of the extended portion 56 of the cover 55 comes to rest upon the surface 52 of the hinge block 42. In either position, the hinge block 46 is maintained in an essentially horizontal position during its operation.

The hinge block 46 is provided with the cutout portion 53 in which film to be cut and spliced is operably positioned. Replaceable film register pin plates (not shown) can be provided whereby it is possible to quickly change from one film format to another without any change to the basic splicer itself. The setscrew 54 is provided for that purpose, the hinged film block 46 being threadably bored to receive same. In conjunction with the pin plates, the present splicer incorporates the film format selector switch 133 (FIG. 2) whereby the travel distance of the anvil subassembly 91 of the ultrasonic bonding means 13 can be altered depending upon whether 8 mm, 16 mm or 35 mm film is being spliced. The selector switch 133 electrically completes a circuit to three different sets of limit switches for reversing the anvil drive motor and electrically activating the transducer member 90 of the ultrasonic means 13, as described in further detail hereinafter.

The film block cover 55 is provided for clamping a film strip within the slot 53 of the film block 46. The cover 55 is essentially flat and provided with the extended journaled portion 56 which in turn is provided with a bore hole 57 through which the hinge pin 45 extends, the extended portion 56 of the cover plate 55 fitting within the spaced apart portion 47 and 48 of the film block 46. In such manner, the cover plate 55 can be rotated in juxtaposition with the hinged film plate 46 so as to confine a film strip placed between the members, and conversely, rotated backwards so as to allow removal of the film strip. The cover plate 55 is provided with the resilient film clamp pad 58 which is attached to the plate 55 in such a position that it fits within and mates with the cutout portion 53 of the film block 46. The member 58 is preferably elastic thereby allowing of various thicknesses of base material to be spliced without mechanical changes to the splicer.

The film block subassembly 41 is provided with a cover latch assembly which comprises the release catch which is adapted to fit within the opening 60 provided in the film block plate 46, the release catch extending therethrough such that its overhanging lip portion 61 can come into contact and mate with the lip 62 of the latch member 63 which is bolted to the cover plate 55 by virtue of the pair of screws 64. The release catch is provided with the aperture 65 through which the shaft release handle 66 extends, the film block plate 46 being provided with the apertures 67 bored to receive the shaft 66 upon which the release catch reciprocates in a horizontal direction to allow engagement and disengagement of the extended lip portions 61 and 62 of their respective members. The set screw 68 is provided, the catch release being threadably bored to receive same, for fixing the catch upon the shaft 66. By virtue of spring means (not shown) positioned between the release catch and the front inside portion of the opening 60 provided in the plate 46, the catch is continually urged to a rear position whereby upon closing the cover 55, the beveled surfaces of the latch 63 and the release catch thereby force the release catch to a forward position toward the operator until the extended portions 62 and 61 become engaged. Correspondingly, upon the operator pulling the catch release by placing a finger in the curved handle portion 69 towards him, the cover plate 55 is released and can thereby be swung up and back to gain access to the film strips clamped within a given film block The cam members 70 and 72 are provided for shifting the film block assembly 41 to the right, or inward, as the film block assembly 41 is rotated 180° up and away from the operator in the course of transporting the film edges to be spliced to the ultrasonic compression zone. The inboard cam 70 which is provided with a cam surface over essentially 50 percent of its radial surface is attached to the extended journaled portion 48 of the film block 46 by virtue of the roll pin 71. Conversely, the outboard cam 72, of similar design to that of the cam 70, is attached to the hinge block 42 by virtue of the roll pin 73. The spring 74 which is adapted to bayonnet upon the hinge pin 45 and operably fit within a clearance provided between the shoulder thereof and the bushing 49, is provided for urging the film block subassembly 41 away from the center line of the splicer. As the film block subassembly is rotated up and backwards through 180°, the cams 70 and 72 force the block inward which provides the overlap and alignment of the film edges on the bonding means 13.

Referring to FIGS. 1 and 3 of the drawings, the cutter assembly 12 comprises fixed cutter blade member 80 which is permanently affixed to the face plate 14 at essentially the center line of the present splicer and also inline with the horn member of the bonding means 13. The fixed cutter 80 is adapted to mate with the movable cutter blade 81, the latter being adapted to guillotine downwards through the fixed cutter 80 whereby the cutting edges 82 of member 81 are caused to sever the film edges preparatory to their splicing. The movable cutter blade 81 is mounted upon the cutter arm 83 by virtue of the screws 84, those members being adapted to receive same. In such fashion, the cutter blade 81 can be readily removed for replacement or resharpening due to their eventual wear, especially when cutting polyester film which is known to be a very tough material. The cutter arm 83 is also bored to receive the setscrew 85 which is provided for attaching the knob 86 thereto. The cutter arm shoulder screw 87 is provided for mounting the cutter arm 83 to the right hand hinge pin 88, the latter being threadably bored to receive same and the arm 83 being provided with the aperture 89 through which the bolt 87 bayonets whereby the cutter arm assembly can be caused to rotate about the longitudinal axis of the mounting bolt 87.

It can be appreciated that the amount of film overlap will be a factor of the amount of lift built into the cams 70 and 72 coupled with the exact positions at which the film is severed, that is, how far off the centerline of the horn portion of transducer 90 (the cutter blade 81 being located on the same centerline). Thus, for a cutter blade width of 0.16 inches and a cam lift of 0.09 inches, the overlap on the horn would amount to 0.02 inches. The optimum amount of overlap ranging between about 0.014 to about 0.25 inches is suitable for most photographic systems.

Figure 4:
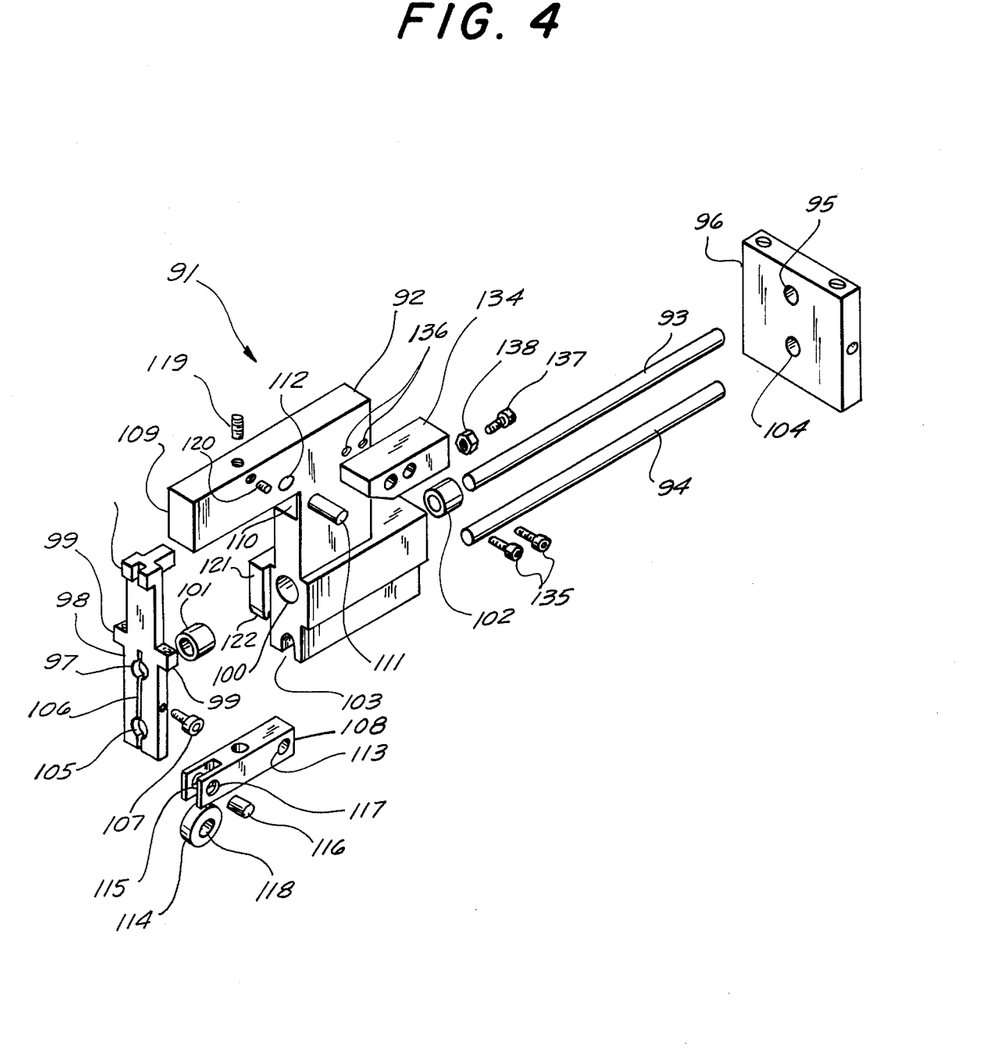
FIG. 4 represents an exploded isometric view of the movable anvil and its supporting superstructure.

The ultrasonic bonding means 13 in turn further comprises the transducer 90 and the movable anvil subassembly 91 which is shown in greater detail in FIG. 4 of the drawings. The latter further comprises the L-shaped anvil block 92 which is designed to reciprocate relative to the horn. This is accomplished by virtue of the anvil block 92 being slidably mounted on the guide rods 93 and 94. The guide rod 93 is rigidly fixed in a horizontal position by virtue of its rear portion being pressed within the aperture 95 of the support block member 96. The front portion of the guide rod 93 fits within the aperture 97 of the upright anvil support member 98 which in turn is mounted upon the face plate assembly 14 by virtue of the extended side portions 99. The L-shaped anvil block 92 is provided with the bore hole 100 which is bored to receive the bushings 101 and 102, through which the guide rod 93 bayonnets and upon which the anvil block 92 reciprocates.

The anvil block 92 is also provided with the elongated slot 103 extending along its bottom portion and which is of a width sufficient to receive the lower guide rod 94. The latter relationship serves to maintain the anvil block 92 continually in an upright position. The guide rod 94 is permanently mounted in a horizontally fixed parallel spaced apart relationship beneath the guide rod 93 by virtue of its rear portion being fitted within the aperture 104 of the support block 96 and its front portion being retained within the aperture 105 of the anvil support member 98. The latter is provided with the slotted portion 106 extending across the apertures 97 and 105 whereby the front portions of the guide rods 93 and 94 can be rigidly affixed to the anvil support 98 upon tightening of the screw 107 the support 98 being bored and threaded to receive the same whereby the sides of the anvil support 98 adjacent the slot 106 can be drawn together or compressed to thereby constrain the guide rods 93 and 94 fitted therebetween.

The anvil block 92 is adapted to receive the anvil arm 108 within its overhanging portion 109 which is hollowed out or provided with the compartment 110 in which the anvil arm 108 nestles. The anvil arm 108 is pivotally retained within the compartment 110 by virtue of the dowel pin 111 which bayonets through the aperture 112 provided in the overhanging portion 109 and through the aperture 113 provided in the anvil arm 108 whereby the anvil arm 108 can be caused to rotate about the longitudinal axis of the dowel pin 111. The anvil arm 108 is provided with the rolling anvil 114 which is rotatably mounted within the slotted portion 115 of the arm 108, being rotatably mounted therein by virtue of the shaft 116 which fits through the apertures 117 provided in the end of the arm 108 and which also passes through the centered aperture 118 provided in the roller 114 which is designed to rotate about the longitudinal axis of the shaft 116. The overhanging portion 109 of the anvil block 92 is threaded on its outside to receive the spring plunger 119 whereby the amount of pressure exerted by the anvil roller 114 upon the film strip being spliced can be adjusted. The set screw 120 is provided, the overhead portion 109 being threadably bored to receive same, for locking the anvil arm 108 into a fixed position once the proper operating pressure has been set.

The spring plunger 119 preferably has an adjustment range between about 2.7 to about 7.3 pounds which provides essentially constant pressure for most conventional film thicknesses which generally range from 3 to 7 mils.

The anvil block 92 is provided with the gear rack portion 121 which comprises a multitude of the gear teeth 122 extending horizontally along the bottom portion thereof. Referring to FIG. 2 of the drawings, the gear teeth 122 mesh with the pinion gear 123 whereby rotation of the pinion gear 123 causes the anvil block assembly 92 to move backwards or forwards along the path defined by the guide rods 93 and 94 depending upon the direction of rotation of the pinion gear 123. The pinion gear 123 is supported and rotatably attached to the gear box 124 which in turn comprises a series of reduction gears which are rotated by virtue of the electric motor drive 125. The gear box 124 is mounted upon the underside of the face plate assembly 14 as well as being attached to the support member 126. These members in turn are affixed to the support block 96 and the horizontal support plate 127 to which the transducer 90 is operably attached by virtue of the collar block 128, the transducer 90 being retained between these members by virtue of the screws 129 whereby the members can be joined together around the base of the transducer 90.

The transducer means 90 can comprise any well known device for imparting vibratory motion or producing oscillatory energy at the tip or top edge 130 of the horn portion of transducer 90. The transducer means 90 preferably comprises a piezoelectric crystal, however, other devices such as a magnetostrictive type transducer, or the like, can be employed. The horn is dimensioned relative to the type of transducer means 90 such that its top portion 130 when vibrated will have a frequency vibration in the ultrasonic range. A suitable transducer would be one having a lead zicronate titanate crystal having a power demand of 60 to 70 watts with 50 Kilohertz resonant frequency. The transducer means 90 is operably connected to the generator means 131 for actuation thereof. The generator 131 can be any suitable device for converting the line power input to electrical pulses capable of actuating the transducer means 90. The ultrasonic generator 131 is affixed to the bottom of the face plate assembly 14 and is electrically connected to the transducer 90 in the manner shown in the wiring schematic of FIG. 5 of the drawings.

The ultrasonic generator 131 supplies essentially constant power to the transducer 90. However, the greater the pressure applied to the ultrasonic horn by the anvil 114, then the greater the power utilization from the generator 131. Thus, the thicker the film base, the higher the anvil will be raised off of the horn portion of transducer 90 and as the anvil 114 is moved further up from the horn, then the greater the spring pressure applied to the anvil 114 by the member 119.

The transformer means 132 is provided for dropping the 110 volt 60 cycle line current down to 10 volts for operating the various other components of the present splicer pursuant to its mode of operation as described below. The transformer 132 is mounted to the bottom side of the face plate assembly 14 and is operably connected in the splicer circuit as shown in the wiring schematic of FIG. 5 of the drawings.

Figure 5:
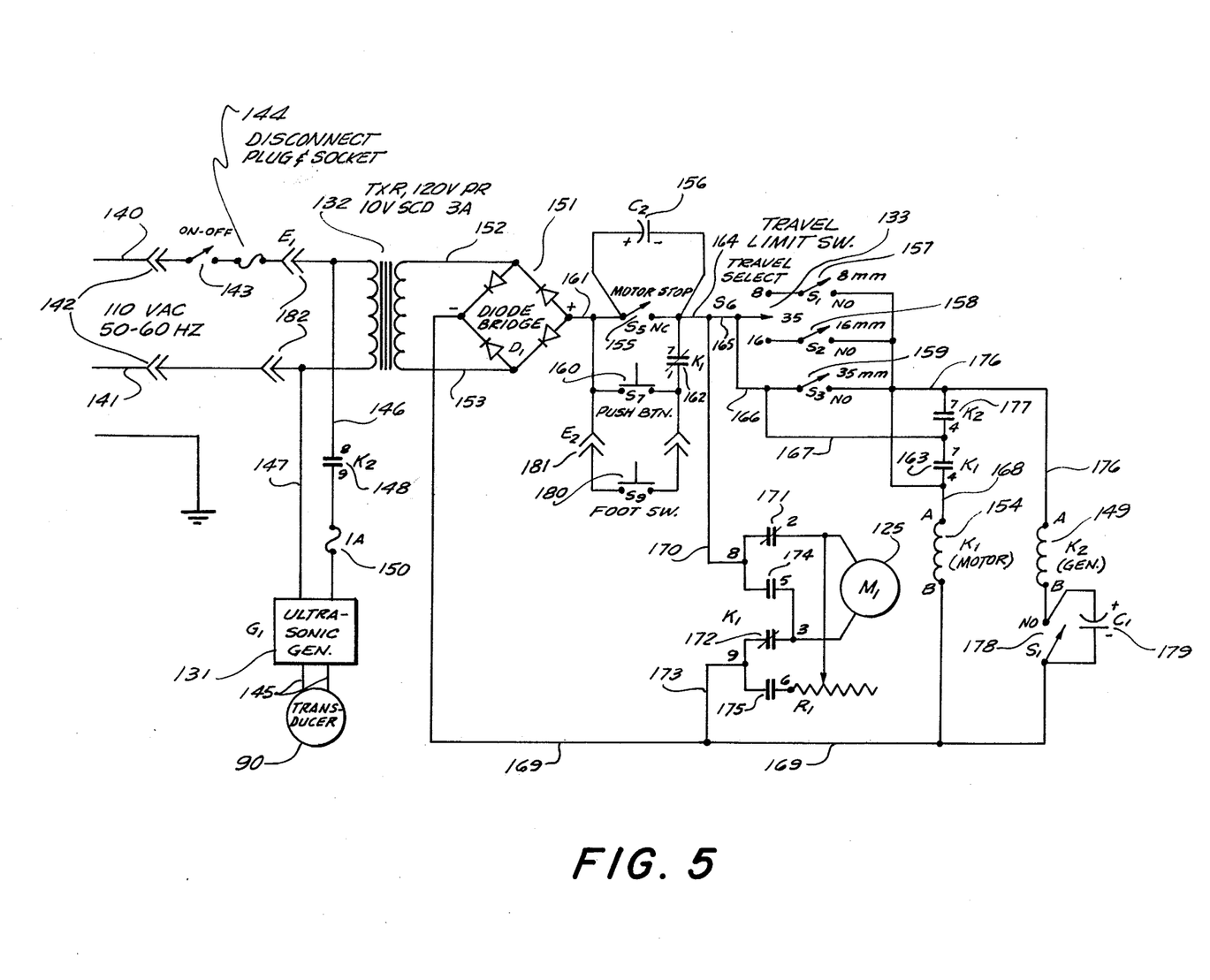
FIG. 5 represents an electrical schematic of the electrical circuit and its components employed in the present splicer.

The travel limit switch 133 is provided for setting the extent of horizontal travel of the roller anvil means 114 over the tip 130 of the horn portion of transducer 90. Thus, by virtue of the film format selector switch, the travel distance of the anvil subassembly 91 can be altered depending upon whether 8 mm, 16 mm or 35 mm film is being processed for splicing. The selector switch 133, as shown in FIG. 5 of the drawings, completes a circuit to three different sets of limit switches for reversing the drive motor 125 and electrically activating the transducer generator means 131, as explained in further detail below. The anvil subassembly 91 is thus caused to traverse the preselected film format width by virtue of the electrical fractional horsepower gearhead motor 125 which is controlled as to length of travel, speed and direction through the electromechanical circuit consisting of function, limit switches, and relays, as also explained below.

Referring to FIG. 5 in the drawings, together with FIG. 2, the present splicer further comprises the various electrical components shown for its operational sequence. A 110 volt grounded electrical power source is supplied to the splicer 10 by the leads 140 and 141 to which the splicer is operably connected by standard electrical plug means 142, the splicer being grounded through the support member 22. The Onelectrical power is supplied to the various splicer components. The electrical fuse 144, generally about 3 amps capacity, is provided for disrupting the electrical power in the event a short or overload occurs in the circuit. The leads 140 and 141 are operably connected to the transformer 132 which is a standard 120 volt AC transformer capable of reducing the voltage to 10 volts with a 3 amp capacity. The transducer 90 is operably connected to the ultrasonic generator 131 by virtue of the leads 145, the generator 131 in turn being operably connected in parallel across the conduits 140 and 141 by virtue of the leads 146 and 147. The conductor 146 is connected to the ultrasonic generator 131 through the normally open contacts 148 which constitute part of and are actuated by the relay 149 in the manner described infra. The one amp fuse 150 is provided in series in the conduit 146 should an overload or short occur in the generator 131. The diode bridge 151 is operably connected across the letdown voltage leads 152 and 153 of the transformer 132 whereby the voltage impressed upon the remainder of the splicer circuit is no greater than 10 volts direct current. The diode bridge 151 can be a silicon rectifier or the like, capable of changing the alternating current output of the transformer 132 to a direct current power source. The direct current fractional horsepower electrical motor 125 is connected in parallel across the circuit established by the diode bridge 151, together with the relay 149 and the relay 154.

Referring additionally to FIG. 1 of the drawings, the normally closed micro-switch 155 is provided for actuating the electrical motor 125. The switch 155 is maintained in a normally open position when the splicer is not in operation at a normal rest state by virtue of the cam member 134, which is also shown in greater detail in FIG. 4. The cam member 134 is affixed to the anvil block 92 by virtue of the pair of screws 135, the block 92 being provided with the threaded mounting holes 136 to receive same. The cam block 134 is also bored and threaded to receive the capscrew 137 which in turn is operably adjusted and fixed in position by the lock nut 138 to contact the moment arm of the microswitch 155 to thereby set it in a normally open position when the anvil block 92 is in its rear at rest position. Upon actuation of the anvil subassembly 91, the anvil block 92 moves forward thereby allowing the switch 155 to close. The capacitor 156 is provided in parallel with the switch 155 to prevent undue arcing of its contact points.

As brought out above, the present splicer is provided with the film format selector switch 133 whereby the travel distance of the anvil subassembly 91 can be altered. The switch 133 operates in conjunction with the travel limit switches 157, 158 and 159, which are shown in their structural relationship to the cam 134 by which they are operated in FIG. 1. As shown in FIG. 5, if the selector switch 133 is allowed to remain in the position as shown, viz. ready for splicing 35 mm film, then upon the circuit being completed through the relay 154 which is accomplished by the operator depressing the normally open pushbutton switch 160 whereby a circuit is established through the motor 125 by virtue of the conduit 161, through the pushbutton switch 160 connected in series therewith, through the normally closed contacts 162, through the connectors 164 and 170, through the normally closed contacts 171, through the motor 125, through the normally closed contacts 172, and completed through the lead 173 to the lead 169. This energy flow initiates operation of the motor 125 whereupon the microswitch 155 closes thereby continuing the circuit even after the operator releases the push button switch 160. As the anvil subassembly 91 travels forward, it first strikes the moment arm of the normally open switch 178 and then continues on until that point in its travel at which the cam 134 strikes the moment arm of the switch 159, viz. the width of the 35 mm film. At that moment, the circuit through the conduit 168 and the relay 154 is established. The relay 154 thereupon actuates the contacts 171 and 172 in the motor circuit which are caused to open and the contacts 174 and 175 caused to close reversing the circuit within the motor 125 such that power flows through the conduit 173, the switch 175, the variable resistor $R_1$, the motor 125, through the switch 174, the conduit 170 and completed across the circuit through the lead 165. When the relay 154 is energized, the contacts 162 are opened which takes the push button 160 out of the circuit. The relay 154 also closes the switch 163 which establishes a by-pass circuit through the conduit 167 around the switch 159. This is required since the latter returns to a normally open state upon the motor 125 reversing its direction of travel pursuant to the mode of operation described above.

At the moment when the coil of the relay 154 is energized, the coil of the relay 149 is energized by completion of the circuit through the conduit 176, relay 149, and the switch 178 (the latter having been previously closed as brought out above). The switch 178 is provided with the condenser means 179 wired in parallel there across to prevent undue sparking at the switch contacts. When this circuit is thus closed, the relay closes the switch 148 in the ultrasonic generator circuit whereupon the transducer 90 is actuated as the motor 125 is reversed and the anvil 114 initiates its return travel back over the surface 130 of the horn of transducer 90, the film to be spliced being confined within the compression zone defined between said members.

The relay 149 when actuated simultaneously closes the contacts 177 which establishes a by-pass sustaining circuit for the relay 149 (similar to that of the switch 163 for the relay 154) upon the switch 159 being opened. In such manner, the relay 149 (as well as the relay 154) is kept locked in the circuit.

In the case of splicing a shorter width film, for example, 8 mm, the operator would first switch the switch 133 to the 8 mm contacts whereupon depressing the pushbutton 160, a circuit would be established as set forth above with regard to the splicing of 35 mm film whereupon the motor 125 would be driven in a direction so as to move the anvil subassembly 91 to a forward position by virtue of the circuit being established through the lead 170, contacts 171, the motor 125, contacts 172, the lead 173, and completed to the lead 169. Upon the anvil subassembly 91 moving forward until the point at which the cam 134 closes the contacts of the switch 157, the relay 154 would then be energized whereby the motor switches would be reversed in operation, that is, the switches 171 and 172 would open and the switches 174 and 175 close. In such manner, the direction of rotation of the motor 125 would then be reversed. At the point of travel where the cam 134 closes the contacts 157, the relay 149 would also be actuated thereupon closing the switch 177. This sequence of events would maintain the flow of electricity to the generator 131 by the flow of electricity across the leads 165 and 169 which occurs through the conduit 166, the conduit 167, the contacts 177, the conduit 176, the relay 149 and the switch 178. Upon the anvil subassembly 91 reaching its retracted position, the switch 155 is caused to open upon contact with the cam 134 thereby interrupting operation of the motor 125, and the switch 178 is tripped open thereby interrupting power to the generator 131. The balance of the circuit would operate in the manner described above when splicing 35 mm film.

The foot switch 180 is an optional feature and can be connected in parallel across the switch 160 by virtue of the connectors 181 to serve the same function as the switch 160. However, this allows the operator to initiate operation of the present splicer by his foot, thereby leaving his hands free for handling the film and performing the other functions for making a film splice.

The present circuit also preferably comprises the interlocking disconnect plug assembly 144 (FIG. 5) whereby upon removal of the face plate assembly 14 from the support 22, power to the various electrical components is automatically disconnected. This is accomplished by virtue of one half of the plug being attached to the face plate assembly 14 and the other to the support 22.

To splice a given pair of film strips, the operator first turns on the power switch 143 (FIG. 5) which is operably positioned at the back of the splicer support 22 (FIG. 1 — not shown). The film block subassemblies 40 and 41 are placed in their initial operating position as shown in FIG. 1 of the drawings. The respective film block covers thereof are then released by the operator hooking the catch release with one finger placed in the curved portion 69 and an upward pull exerted toward the operator. The operator then makes certain that the appropriate film register plates (not shown) are installed, for example, within the groove 53 of the hinged film block 46, being secured therein by virtue of the retainer set screw 54. The film format selector switch 133 is then set in the desired position, namely, in the center for 35 mm, to the right for 16 mm, or to the left for 8mm.

It is preferred that the ends of the film strips be severed or dressed individually or one at a time. Accordingly, the following sequence of events will be described with reference to the lefthand film block subassembly 41.

Following selection and setting of the machine for the splicing of a given film size, the movable cutter blade assembly 83 is then moved to a fully raised position. One of the film strips to be spliced is then inserted into the film block 46 such that the end to be spliced overlaps the edge of the stationary cutter blade 80 nearest the block 46. Care should be exercised to locate the frame line on the cutting edge of the stationary cutter blade 80 nearest the film block being loaded, block 46 in this instance. The film may be spliced emulsion side up or emulsion side down. The operator then closes and locks the film block cover 55. He then flips the movable cutter assembly 83 down quickly to achieve a clean cut. The film block sub-assembly 41 is then rotated to the rear position by lifting up and rotating towards the rear.

The above steps with regard to the film block subassembly 41 are then repeated for the righthand film block sub-assembly 40.

The operator then depresses and holds the start button 160 down for approximately one second. The roller anvil subassembly 91 will then move forward and weld the film on the return traverse pursuant to the mode of operation discussed supra. Care should be exercised not to operate the splicer without having film in the splicing position since excessive wear on the horn of transducer 90 may result. It is to be pointed out that by virtue of the film format selector design of the present splicer, the anvil roller 114 will only travel over that portion of the tip 130 of the horn of transducer 90 which is covered with film to be spliced thereby avoiding the problem of the members being in direct contact which eventually would result in excessive wear of the horn as is characteristic of prior art splicers.

When removing the spliced film, it is preferred that only one of the film block subassemblies be opened at a time and the film removed, especially in the case of splicing perforated film. In the latter instance, care should also be exercised to disengage the perforation of the film from a given film block before opening the cover on the adjacent film block subassembly and removing the film portion therefrom. This procedure will minimize the possibility of inflicting damage to the splice and/or the film.

As brought out above, the present splicer provides a greater variety of operation sequence and concomitantly provides for the splicing of a greater variety of film sizes in a very efficacious method which minimizes film wastage and machine costs. One attractive design feature of the present splicer is the fact that the speed and pressure exerted by the anvil 114 upon the film can be changed to accommodate different film thicknesses. To change the anvil speed, the top cover 23 is removed and the screw adjustable variable resistor $R_1$ located on the opposite side of the anvil block 92 shown in FIG. 4 can then be adjusted such that increasing the resistance slows the anvil speed and decreasing the resistance increases the anvil speed. The anvil pressure, that is, the line contact established between the roller anvil 114 and the top surface 130 of the tip of the horn of transducer 90, can be adjusted by turning the spring plunger 119 shown in FIG. 4 clockwise. Conversely, turning it in a counterclockwise direction increases the pressure. To accommodate different film widths, whether perforated or unperforated, film formats as described above are employed.

The method of the instant invention comprises retaining the edges of two film strips to be spliced in a fixed spaced apart relationship; severing the edges of the two film strips whereby their edges are arranged in a mating relationship; transporting the edges of the severed film strips within an ultrasonic compression zone wherein the edges of the film strips are positioned in an overlapping relationship; and binding said film strips together by applying oscillatory energy to the overlapped edges of the film strips by confining them between transducer means comprising a narrow elongated horn member and a rotatably mounted anvil member positioned opposite each other so as to define a compression zone wherein the oscillatory energy is imparted to the overlapped edges of the film strips by line contact applied essentially perpendicular to the overlapped film strips.

To demonstrate the unique advantages and features of the present splicer, a series of 150 splices were made and tested for tensile strength. The film employed was 16 mm vesicular type film of 3 mils thickness. An overlap of 0.018± 0.003 inches and a welding time of 3 seconds with an anvil pressure of 10 ounces were employed.

| TABLE ON FILM SPLICE BREAKING STRENGTH | | | | | | |
| --- | --- | --- | --- | --- | --- | --- |
| Breaking strength in lbs. | 13 | 17 | 19 | 27 | 30 | No Break |
| Number of samples | 1 | 1 | 2 | 117 | 3 | 26 |

The above test splices were made in the raw stock and then processed with the result that no fogging in the area of the splice was evident. Splices were also made on raw stock and the film printed and processed. Again there was no evidence of changing of the photographic characteristics of the emulsion. Additionally, the welds were found to be structurally sound and consistent across the entire width of the film.

The materials of construction of the present splicer are not critical in themselves as long as a given material possesses sufficient strength and rigidity to perform the function indicated. However, the splicer preferably is constructed largely of aluminum incorporating various special materials having specifically desired unique properties, such as as a low coefficient of friction or the like. The electrical components of the present splicer are all of standard manufacture and readily available in the trade. Moreover, it will be apparent to one skilled in the art that various changes can be made in the materials of construction, as well as modifications in the design and mode of operation of the present ultrasonic splicer means without departing from the true scope and spirit of the present invention, and accordingly, what I consider to be the true scope and ambit of the present invention is that as set forth and embodied in the appended claims.

I claim:

1. A film splicer comprising:
   ultrasonic energy generating means mounted in a fixed position and including a transducer having a horn portion provided with a narrow elongated working edge, said transducer when energized generating vibratory motion in the ultrasonic range at said horn portion;
   anvil means having a rotatably mounted circular member operably disposed opposite said working edge of the horn along its longitudinal axis for movement thereover in a spaced apart relationship to form a compression zone wherein film strips to be spliced across their widths may be fed into contact with the working edge of said horn portion and said circular anvil member;
   control means operably connected to said anvil means for controlling the rate of movement of said rotatably mounted circular member over said working edge;
   film cutting means operably positioned in proximity to the horn portion of said transducer; and
   two film block assemblies rotatably positioned in a substantially horizontal plane in spaced apart relationship on opposite sides of the arrangement of said film cutting means and said transducer, said assemblies including means for causing said assemblies to converge towards one another when the assemblies are rotated upwards and backwards from a position adjacent said cutting means to a position adjacent the working edge whereby film strips clamped in said film block assemblies and severed by said cutting means converge toward each other and cause the severed edges of the strips to overlap said working edge within the compression zone.

2. A film splicer according to claim 1 wherein said anvil means further comprises means for continually applying pressure to said rotatably mounted circular member.

3. A film splicer according to claim 2 wherein said pressure means is adjustable such that the pressure exerted on film within the compression zone can be varied within a range of substantially 2.7 to 7.3 pounds.

4. A film splicer according to claim 3 comprising:
   film width selector means for determining the length of travel of said anvil means over the working edge of said transducer, said selector means including means associated with said anvil for automatically sensing said travel length during the initial travel of said anvil means over the working edge.

5. A film splicer according to claim 4 wherein said means for automatically sensing the travel length comprises micro-switch means operatively related to the anvil means whereby upon said anvil means reaching a point in its initial travel essentially equal to the width of the film being spliced, said switch is actuated to reverse the direction of movement of said anvil means thereby avoiding direct contact between the working edge of the transducer and the anvil means.

6. A film splicer comprising:
   ultrasonic energy generating means including a transducer having a horn portion provided with a narrow elongated working edge, said transducer when energized generating vibratory motion in the ultrasonic range at said horn portion;
   anvil means operably disposed opposite said working edge of the horn along its longitudinal axis is spaced apart relationship with said horn to form a compression zone wherein film strips to be spliced across their widths may be fed into contact with the working edge of said horn portion and said anvil member;
   means for selectively producing relative movement between the anvil and the working edge of said horn by an amount corresponding to differing widths of film strips to be spliced;
   film cutting means operably positioned in proximity to the horn portion of said transducer; and
   two film block assemblies rotatably positioned in a substantially horizontal plane in spaced apart relationship on opposite sides of the arrangement of said film cutting means and said transducer, said assemblies including means for causing said assemblies to converge towards one another when the assemblies are displaced from a position adjacent said cutting means to a position adjacent the working edge whereby film strips clamped in said film block assemblies and severed by said cutter means converge toward each other and cause the severed edges of the strips to overlap said working edge within the compression zone.

7. A film splicer according to claim 6 wherein said horn portion is fixed and said anvil is movable.

8. A film splicer according to claim 7 further comprising:
   control means operably connected to said anvil for controlling the rate of movement of said anvil over the working edge of the horn portion.

* * * * *